United States Patent [19]

Kuchel et al.

[11] Patent Number: 5,135,309
[45] Date of Patent: Aug. 4, 1992

[54] METHOD AND APPARATUS FOR NON-CONTACT MEASURING OF OBJECT SURFACES

[75] Inventors: Michael Kuchel, Oberkochen; Albrecht Hof, Aalen, both of Fed. Rep. of Germany

[73] Assignee: Carl-Zeiss-Stiftung, Heidenheim/Brenz, Fed. Rep. of Germany

[21] Appl. No.: 666,247

[22] Filed: Mar. 8, 1991

[30] Foreign Application Priority Data

Mar. 9, 1990 [DE] Fed. Rep. of Germany ....... 4007500

[51] Int. Cl.$^5$ .............................................. G01B 9/00
[52] U.S. Cl. ................................. 356/376; 250/237 G
[58] Field of Search ..................... 356/376; 250/237 G

[56] References Cited

U.S. PATENT DOCUMENTS

| | | | |
|---|---|---|---|
| 3,627,427 | 12/1971 | Johnson | 356/376 |
| 4,488,172 | 12/1984 | Hutchin | 358/107 |
| 4,499,492 | 2/1985 | Hutchin | 358/107 |
| 4,564,295 | 1/1986 | Halioua | 356/376 |
| 4,641,972 | 2/1987 | Halioua et al. | 356/376 |
| 4,871,256 | 10/1989 | Grindon | 356/376 |

FOREIGN PATENT DOCUMENTS

| | | |
|---|---|---|
| 0121353 | 10/1984 | European Pat. Off. . |
| 0262089 | 3/1988 | European Pat. Off. . |
| 2279066 | 2/1976 | France . |
| 2292213 | 6/1976 | France . |

OTHER PUBLICATIONS

"Moiré Topography" by H. Takasaki, *Applied Optics,* vol. 9, No. 6, Jun. 1970, pp. 1467-1472.

"Scanning moiré Method and Automatic Measurement of 3-D Shapes" by Masanori Idesawa et al., *Applied Optics,* vol. 16, No. 8, Aug. 1977, pp. 2152-2162.

"Interferometric Phase Measurement Using Spatial Synchronous Detection" by K. H. Womack, *Optical Engineering,* vol. 23, No. 4, Jul./Aug. 1984, pp. 391-395.

*Primary Examiner*—Richard A. Rosenberger
*Attorney, Agent, or Firm*—Eugene Stephens & Associates

[57] ABSTRACT

Several bar patterns are projected in sequence on the object (O) to be measured by time-division multiplexing, and images of the bar patterns are recorded by a camera (K). The phases of each bar pattern, as distorted by the object, are calculated for preselected image points by a computer connected with the camera. For each image point, the calculated phases for one of said bar patterns are compared to the phases calculated for at least one other of said bar patterns, thereby producing a beat frequency which can be used to determine height measurements in the direction of the camera axis (z). In order to increase the range of the height measurements, at least two beat frequencies of quite different effective wavelengths are generated and evaluated. Different systems are disclosed for generating the different beat frequencies. In one embodiment, the bar patterns are projected by three different projectors ($P_1$, $P_2$, $P_3$) which are inclined at different angles relative to each other ($\alpha_1$, $\alpha_2$). In a second embodiment, only two projectors are used, but each projector has two gratings, the respective periods of which differ from each other only slightly.

11 Claims, 6 Drawing Sheets

METHOD AND APPARATUS FOR NON-CONTACT MEASURING OF OBJECT SURFACES

TECHNICAL FIELD

The present invention relates to a method and apparatus for the non-contact measuring of object surfaces by means of bar patterns which are projected on the surface of the object, detected, e.g., by a video camera, and evaluated.

BACKGROUND

There are a number of different known methods by which relatively large surface areas of an object can be simultaneously measured along x, y and z coordinates by projecting a regular, grating-shaped pattern onto the surface of the object. These methods, which are referred to as "moire topography", include different variants whereby the so-called moire effect (created by light which passes twice through a grating having the same period) is utilized to obtain height information pertaining to the object being measured.

One of these variants is the "shadow pattern" moire method described by Takasaki in *Applied Optics* 6 (1970), page 1467, in which the object surface to be tested is illuminated by point-source light that is passed through a grating positioned relatively close to the surface. The surface of the object is then viewed through the same grating, but from a point distant from the source of the measuring light, so that the illumination rays and the reflected imaging rays subtend an angle. Inasmuch as the grating pattern projected on the object surface is deformed as a function of the topography of said surface, contour lines are formed as a result of the moire effect as the imaging rays pass through the same grating; and these contour lines provide surface height information. With this method, the contour lines remain visible even if the basic frequency of the grating used for illumination is not resolved at the time of imaging, or even if the grating is "averaged away" by being shifted by one or more full grating periods during the recording of an image.

Another variant of the moire topography method is the so-called "projection moire" method described in U.S. Pat. No. 4,564,295. According to this method, an image of a grating is projected on the object surface, and an image of the object surface is then projected through a lens and a second grating positioned in front of the recording camera. This prior art method permits synchronous shifting of the two gratings—i.e., the projection grating and the grating used for imaging—during the imaging operation, thereby averaging out grating irregularities without changing the contour lines resulting from the moire effect or their location in space. However, this method requires that the gratings have the same grating constant and that the focal lengths of the projecting unit and the imaging lens be the same. This prior art patent further discloses that two projectors can be positioned symmetrically at the same distance and the same angle of projection on either side of the path of measuring rays, i.e., the camera axis. This double projection arrangement generates overlapping and adjoining grating patterns, thereby eliminating the problem of shadows when measuring severely curved object surfaces.

A third variant of the moire topography method dispenses with the second grating at the front of the recording camera and, instead, uses the line raster of the recording video camera or the pixel period of a CCD camera for the function of the second grating. This so-called "scanning moire" method is described in *Applied Optics*, Volume 16, No. 8 (1977), page 2152.

In addition to these just-described moire topography methods, it is also known that an object can be measured by calculating height information directly from the deformation of a bar grating pattern on the object surface without using a second grating in front of the camera. These so-called "bar projection methods" are described in European Patent No. EP-A2-0 262 089, and in U.S. Pat. Nos. 4,641,972; 4,488,172; and 4,499,492.

These prior art moire topography methods and bar projection methods produce quantitative coordinate measurement information by evaluating the cyclical brightness variations of the resulting bar patterns or contour lines. Generally, this is called phase measurement; and this is usually carried out in such a manner that, during the process of making each measurement, the position of the projection grating is shifted in several steps by fixed increments, often corresponding to a phase shift of 90° or 120°.

However, with these known methods, it is relatively difficult to obtain adequate measurements of larger industrial objects, particularly if the surfaces of such objects have irregularities such as edges and tiers. The difficulty arises for the following reason:

Due to the symmetrical perspective arrangement of the projection and viewing rays, the distance of successive contour lines is not constant, but increases with the increasing depth of the object; and without the knowledge of the actual distance of the object surface from the camera at at least one point, it is not possible to obtain data pertaining to the form of a profile of a continuous surface. That is, such conventional methods of phase measurement calculate the object distance only in terms of one complete change of phase and, thus, provide only relative values within one ordinal number of a moire pattern. Therefore, it is not possible with these methods of phase measurement to accurately analyze the sudden large changes in the cyclical bar patterns that occur over the edges and tiers of irregular industrial objects.

In order to increase the range within which bar phase differences can be converted to absolute height measurements without ambiguity, it has been suggested that bar patterns with widely different bar periods be simultaneously projected onto the object surface. Such a system is disclosed in U.S. Pat. No. 4,488,172 in which two projectors with moving gratings create two bar patterns which move over the surface being measured, one of these patterns having a period eight times longer than the other pattern. In order to evaluate the phase relationships between these patterns, the grating used for projection of the longer pattern must be moved at a speed which is eight times faster than the movement of the grating used for the shorter pattern; and this movement results in the loss of a fixed spatial relationship between the two gratings. Unfortunately, such a fixed relationship of the two gratings relative to each other is important when highly accurate measurements are desired.

The apparatus disclosed in European Patent No. EP-A2-0 262 089 generates two moire bar patterns having widely different periodicities. This is accomplished by superimposing two gratings having the same period and then rotating the gratings relative to each other to a varying degree between each projected pattern. The disadvantage to this system, among others, is that it is relatively slow. That is, in order to generate a bar pattern exhibiting a different period, the gratings must be adjusted mechanically, and alternation of the projected bar patterns cannot be accomplished at desired videocycle speeds.

The invention herein overcomes the just-described prior art problems by providing a method and apparatus of the above-identified type which assure clear, absolute height measurements within a wide measuring range, the measurements being characterized by high accuracy and being obtained at high speed.

SUMMARY OF THE INVENTION

In the method and apparatus disclosed herein, at least three bar patterns having the same, or slightly different, periods are projected on the surface of the object being measured; and the reflections of these bar patterns are compared to create at least two beat frequencies. That is, the intensities of the bar patterns are detected, at each camera pixel or other preselected image points; and phase differences between the individual bar patterns are determined. The phase differences (i.e., beat frequency) between a first two of the bar patterns are thereafter compared with the phase differences between two different bar patterns.

In one preferred embodiment, three bar patterns having the same period are projected at different angles, two of the projections being inclined at an angle with each other which is small compared with the inclined angle between either of these two projections and the third projection. The detected beat frequencies have effective wavelengths that are dependent upon the inclined angle between the two patterns being compared. The two small-angle projections produce a wavelength which is long in respect to the wavelength produced by two of the wide-angle projections. By evaluating these two different beat frequencies for each image point, ambiguities concerning height measurements can be eliminated.

In the preferred embodiments, the reflections of each of the individual bar patterns are recorded separately, e.g., by time-division multiplexing or by projection of different-color patterns, and fed separately to an image-processing computer. Therefore, the beat frequencies having different effective wavelengths do not appear on the surface of the object but, instead, are generated only in the computer, i.e., from differences in the bar phases recorded for each image point. Since the projected bar patterns do not overlap on the object surface, each grating can be identified clearly and evaluated individually; and the phase differences between patterns can be determined exactly.

Illuminated gratings are used to project the bar patterns, and so long as the phase relationships between the gratings remain fixed relative to each other, the beat frequency generated in the computer remains constant at each image point. Further, the contour lines defined by the beat frequency of the reflected patterns remain stationary even though the gratings move relative to the surface and/or the camera. Therefore, in the preferred embodiments, the projection gratings are all fixed to a common support so that the accuracy of measurements made by the inventive method is unaffected by interfering environmental influences, such as vibrations, which can result in small changes in the relative positions of the camera and the gratings.

Also, gratings having the same periods can be produced fairly simply in a single manufacturing process by being formed at relatively contiguous locations on a common support. Furthermore, if the gratings are all located on the same plane of the support, the calculation processes required for evaluating the projected bar patterns are simplified.

In another preferred embodiment, only two projectors are used, the projectors being arranged at an angle relative to each other on opposite sides of the recording camera. Two pairs of gratings are used, the periods of each pair are the same, but the periods of the two pairs are sightly different from each other. Each projector has two different gratings, one grating from each pair. The gratings are projected separately, and their bar patterns are used to compute two sets of phase differences for each image point based upon two separate beat frequencies with different wavelengths. Color optics or polarization optics are used to separate the pairs of projected bar patterns.

DETAILED DESCRIPTION OF PREFERRED EMBODIMENTS

Figure 1:
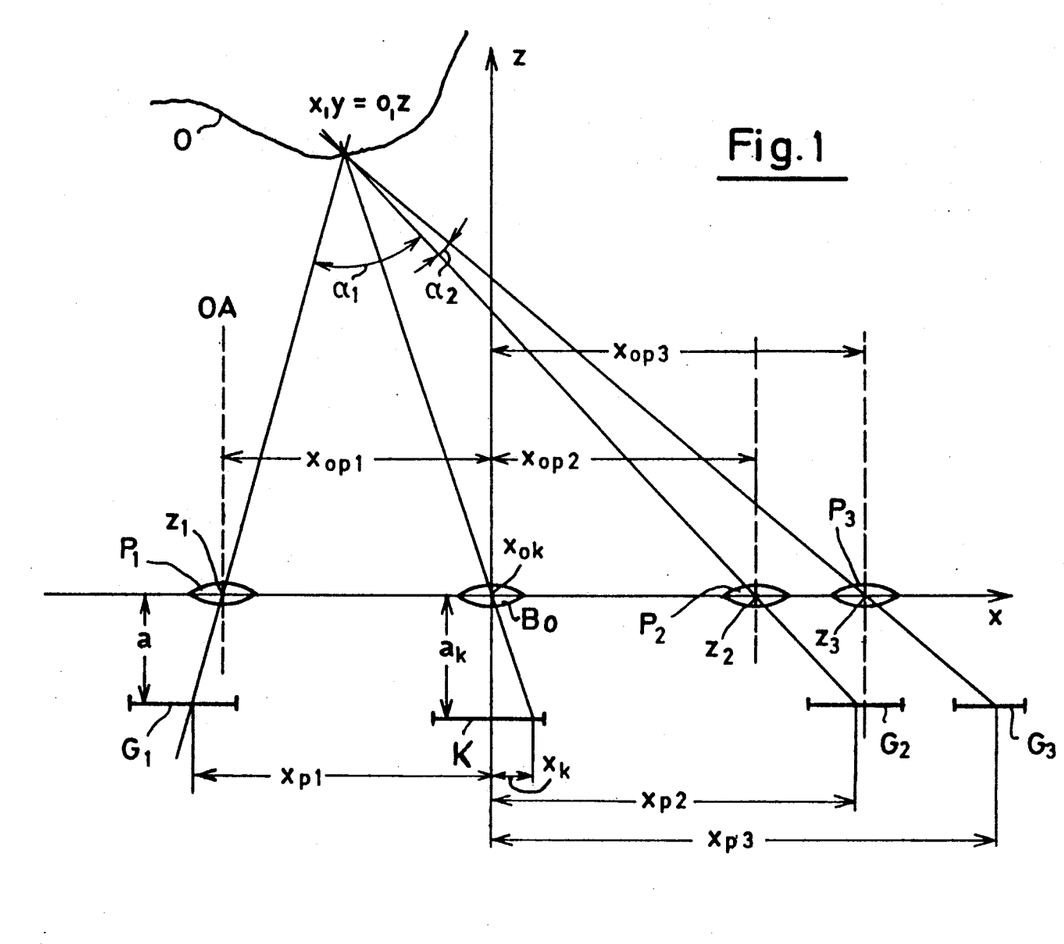
FIG. 1 is a schematic diagram showing the geometrical setup of the optics of one preferred embodiment of the invention herein.

The schematic illustration of FIG. 1 shows a measuring system which essentially comprises three projectors with projection lenses ($P_1$, $P_2$, $P_3$) and three gratings ($G_1$, $G_2$, $G_3$), each having the same grating period, and each being arranged at a distance (a) behind their respective projection lenses ($P_1$-$P_3$). A camera sensor (K) with attached viewing lens ($B_0$) is provided between projectors ($P_1$) and ($P_2$) at a distance ($a_k$) behind viewing lens ($B_0$). While the projectors ($P_1$, $P_2$) are inclined toward each other at a relatively large angle ($\alpha_1$) of approximately 30°, the two adjacent projectors ($P_2$) and ($P_3$) subtend a relatively small angle ($\alpha_2$) of, for example, 0.5°. Angle ($\alpha_2$) is too small to be illustrated in its actual size in the drawings, being achieved in actual practice by arranging projector ($P_2$) and grating ($G_2$) below the drawing plane, while projector ($P_3$) and grating ($G_3$) are arranged above the drawing plane. Shifting of the projectors and gratings in directions parallel to the grating lines does not affect the evaluation of the projected bar patterns, and the projector lens systems are simply arranged so that the projection centers ($Z_1$, $Z_2$, $Z_3$) are aligned along a straight line as shown in FIG. 1.

With this three-projector arrangement, it is possible to define two sets of "constant-phase-difference" plane surfaces perpendicular to the z-axis. Namely, the phase differences occurring between the bar patterns of projectors $P_1$ and $P_2$ create one set of planes, while those relating to the bar patterns of projectors $P_2$ and $P_3$ create another set of planes. Thus, successive surfaces having the same phase differences can be associated with two different effective wavelengths ($\lambda_{eff}$) in the z-direction. The effective wavelength ($\lambda_{eff}$) is determined by the period of the gratings ($G_1$, $G_2$, $G_3$) and the respective angles ($\alpha_1$, $\alpha_2$) between the projection axes of the respective projectors. Since the periods of the gratings ($G_1$, $G_2$, $G_3$) are the same, the effective wavelength ($\lambda_{eff}$) is a function of only the respective angles ($\alpha_1$, $\alpha_2$).

Below are derivations of equations which can be used to calculate the object coordinates (x), (y) and (z) from the bar patterns for the individual points of the object surface projected by the three projectors ($P_1$, $P_2$, $P_3$). This requires that the projection centers ($Z_1$, $Z_2$, $Z_3$) of the projection lenses be located on a straight line extending in the x-direction and that the three gratings ($G_1$, $G_2$, $G_3$) be arranged at the same distance (a) behind said straight line. As shown by the perspective sketch of FIG. 2, the gratings are provided on a common support (W) consisting of glass or another material exhibiting a low coefficient of thermal expansion, e.g., Zerodur, and can be moved together in this fixed relationship relative to CCD camera (K) in the direction of the straight line (x) by means of a spring-biased rocker (not shown). Also, projectors ($P_1$, $P_2$, $P_3$) are provided on a common support (not shown), said support consisting of the same material as the grating support (W). Sufficient heat conduction between the two supports assures a low temperature gradient between them. This reduces the influence of environmental temperature on measuring accuracy. The photosensitive part of the camera, i.e., the CCD sensor, is arranged at a distance ($a_K$) behind the viewing lens ($B_0$).

The schematic illustration in FIG. 1 substantially defines the geometric configuration of the invention's measuring system. The grating locations ($X_{p1}$, $X_{p2}$, $X_{p3}$) projected on the surface of object (O) at point (x,y=O,z) are recorded by video camera (K). The center ($X_{ok}$) of camera lens ($B_0$) is the origin of the coordinate system predetermined by the alignment of projectors ($P_1$, $P_2$, $P_3$). By the construction of similar triangles as generally indicated in FIG. 1, the following relationships are obtained for each of the three projectors:

$$\frac{x_{p1} - x_{op1}}{a} = \frac{x - x_{op1}}{z} \tag{1}$$

$$\frac{x_{p2} - x_{op2}}{a} = \frac{x - x_{op2}}{z} \tag{2}$$

$$\frac{x_{p3} - x_{op3}}{a} = \frac{x - x_{op3}}{z} \tag{3}$$

and for the camera:

$$\frac{x_k}{a_k} = \frac{x}{z} \tag{4}$$

The combination of the camera equation (4) with the projection equations (1)-(3) results in the following derivatives:

$$z = \frac{x_{op1} \cdot a}{(n_1 + \delta_1)P + x_k \frac{a}{a_k}} \tag{5}$$

$$z = \frac{x_{op2} \cdot a}{(n_2 + \delta_2)P + x_k \frac{a}{a_k}} \tag{6}$$

$$z = \frac{x_{op3} \cdot a}{(n_3 + \delta_3)P + x_k \frac{a}{a_k}} \tag{7}$$

where the differences ($X_{opi} - X_{pi}$, i=1 ... 3) are expressed as representing ($n_i + \delta_i$) times the bar period (P) with ($n_i$) representing an element of the natural numbers and ($\delta_i < 1$).

If the relationship between the separately-recorded bar patterns of two projectors is considered and phase differences are established, the following are obtained from equations (5), (6) and (7):

$$z = \frac{(x_{op1} - x_{op2}) \cdot a}{(n_1 - n_2 + \delta_1 - \delta_2)P} \tag{8}$$

$$z = \frac{(x_{op1} - x_{op3}) \cdot a}{(n_1 - n_3 + \delta_1 - \delta_3)P} \tag{9}$$

$$z = \frac{(x_{op2} - x_{op3}) \cdot a}{(n_2 - n_3 + \delta_2 - \delta_3)P} \tag{10}$$

or $$z = \frac{K_1}{N_1 - \Delta_1} \tag{11}$$

$$z = \frac{K_2}{N_2 - \Delta_2} \tag{12}$$

$$z = \frac{K_3}{N_3 - \Delta_3} \tag{13}$$

wherein:

$K_1$, $K_2$, $K_3$ represent apparatus constants,
$N_1 = n_1 - n_2$, $N_2 = n_1 - n_3$, $N_3 = n_2 - n_3$ and
$\Delta_1 = \delta_1 - \delta_2$, $\Delta_2 = \delta_1 - \delta_3$, $\Delta_3 = \delta_2 - \delta_3$.

Equations (11), (12) and (13) described planes exhibiting constant phase differences ($N_i - \Delta_i$) between each of two projections, said planes being parallel to the x/y-plane. These plants are not a function of the viewing point ($X_k$, $Y_k$) of the camera. The integral numbers ($N_1$, $N_2$, $N_3$) and the fractions ($\Delta_1$, $\Delta_2$, $\Delta_3$) must be determined for measurement.

Surfaces having the same phase difference, as expressed by equations (11), (12) and (13), can be associated with each of the different beat frequencies, i.e., surfaces with the same phase differences related to each effective wavelength ($\lambda_{eff}$). Relatively short effective wavelengths exist for the equation (11) resulting from a combination of the projectors ($P_1$) and ($P_2$) and for the equation (12) resulting from a combination of the projectors ($P_1$) and ($P_3$), while the combination of the two projectors ($P_2$) and ($P_3$) expressed by equation (13) is associated with a relatively long effective wavelength. It is essential that the gratings, projectors, and camera be mounted relative to each other in a fixed relationship, thereby assuring the stability of the angles ($\alpha_1$) and ($\alpha_2$) and the stability of the different effective wavelengths.

For evaluation of the measurements by a computer, equations (11), (12) and (13) can be reformulated:

$$z = \frac{K_1}{int\left(\frac{K_1}{K_3} N_3 + \frac{K_1}{K_3} \Delta_3 - \Delta_1\right) + \Delta_1} \quad (14)$$

$$z = \frac{K_2}{int\left(\frac{K_2}{K_3} N_3 + \frac{K_2}{K_3} \Delta_3 - \Delta_2\right) + \Delta_2} \quad (15)$$

For complete determination of the coordinates (x), (y) and (z) of a selected image point, the lateral coordinates (x) and (y) are calculated satisfying the law of conjugate points as follows:

$$x = \frac{x_k}{a_k} \cdot z \quad (16)$$

$$y = \frac{y_k}{a_k} \cdot z \quad (17)$$

For evaluation, the bar patterns projected by the three projectors (P$_1$, P$_2$, P$_3$) are recorded by time-division multiplexing through lens (B$_0$) of camera (K) and read separately into different image memories. The object coordinates (x), (y) and (z) are computed, in accordance with the above-disclosed equations, by an image-processing computer in the manner described below in conjunction with FIGS. 5a and 5b. The computer processes the image data in video real time. For this purpose, it is set up in the form of a pipeline, including partially parallel data paths, and is controlled by a commercially available process computer, e.g., a Neumann host computer.

Figure 5A:
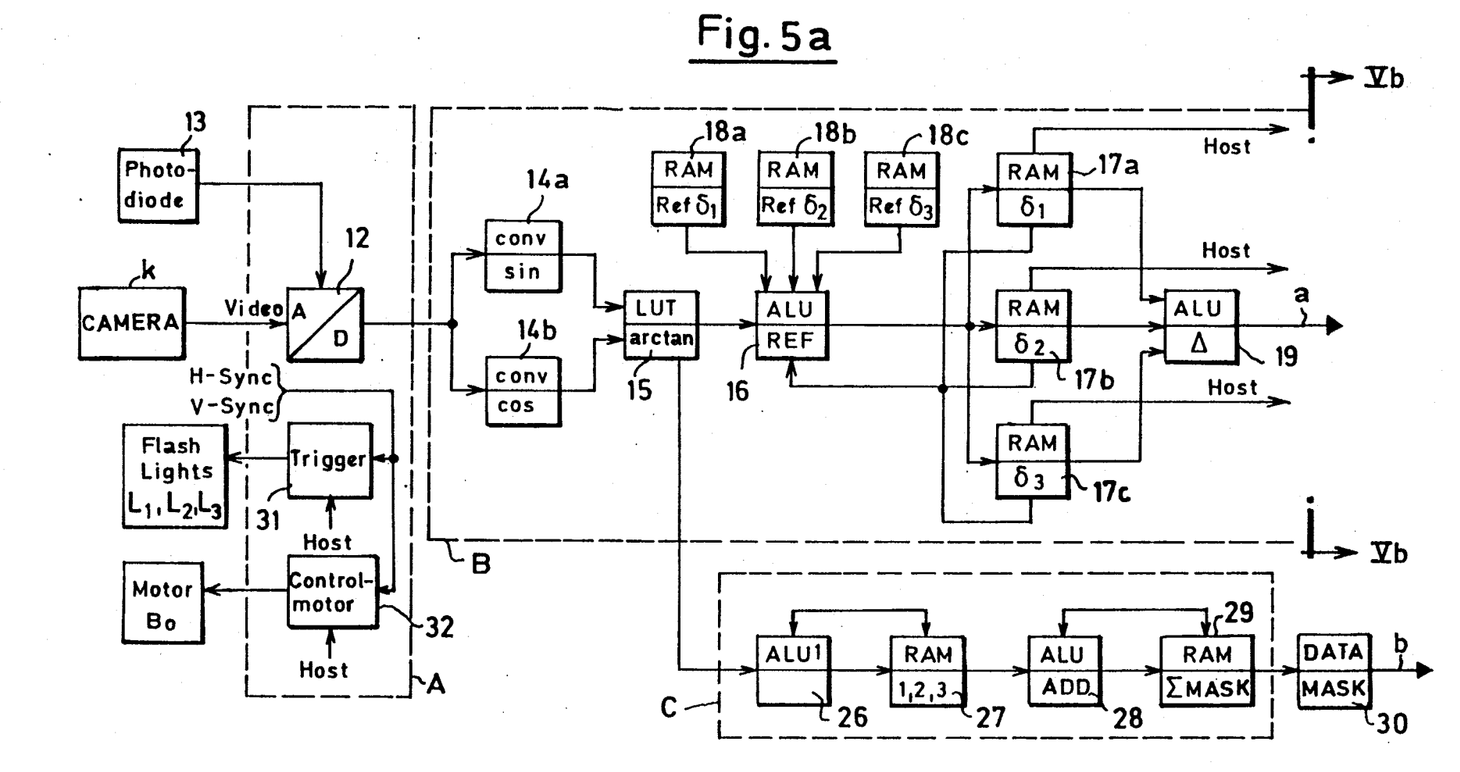
FIGS. 5a-5b are partial block diagrams of essential elements of the invention's computer circuit for evaluating the moire patterns reflected from objects when using apparatus according to FIGS. 1 and 3.

The evaluation computer will now be described in greater detail, making reference to the block circuit diagram in FIGS. 5a and 5b. The computer comprises three different functional modules (A), (B) and (C). The functional module (A) provides the interface between the external sensors and the control components of the apparatus. Module (A) comprises an analog-to-digital converter (12) which digitizes the signal of camera (K) in video real time. The amplification factor for A/D (12) is controlled as a function of the output signal of a photodiode (13) so that the video signal can be adapted to different brightness conditions or energy outputs of the light sources (L$_1$, L$_2$, L$_3$) [see FIG. 2] which are preferably flashlamps. To control the selective operation of the flashlamps (L$_1$, L$_2$, L$_3$), module (A) also includes a trigger circuit (31) which is synchronized with camera (K). Module (A) further contains an electronic control (32) for the motor with which lens (B$_0$) of camera (K) can be focused for different object ranges as indicated by the arrow (Pf$_2$) in FIG. 2. The timing of projector flashes and the focus adjustment of the lens are controlled by an appropriate program in the conventional host computer which, while not shown in FIG. 5, is symbolically represented by the "Host" arrows which appear in the module (A) block and also at three points in the module (B) block in the circuits shown in FIGS. 5a and 5b.

The digitized video signal, upon leaving analog-to-digital converter (12), is fed to the inputs of two parallel "convolution" components (14a) and (14b) of the functional module (B). Each of these two components (14a) and (14b) receives signals relating to a group of contiguous image points, using those signals to calculate the sine and cosine, respectively, of the bar phase at each of a plurality of preselected image points. Algorithms for making such calculations are described in *Optical Engineering*, Volume 23, No. 4 (July/August 1984), pages 391-395.

The outputs of components (14a) and (14b) are fed to a circuit (15) where the bar phase is calculated from the sine and cosine. For this, a table associated with the circuit (15) contains the arc tangent function. At the same time, invalid measured values calculated on the basis of the phase values in the circuit (15) are masked. Invalid values are those which were recorded with either too high or too low an illumination intensity and whose level therefore is either above or below a certain limit. Masking for these invalid image areas is generated in module (C), which parallels the measured-data circuitry of module (B). Module (C) will be described in more detail hereinafter.

The output of the circuit (15) is fed, via an arithmetic logic unit (ALU), to three parallel RAM image storages (17a-c) where the bar phases ($\delta_1$, $\delta_2$, $\delta_3$) of the bar patterns projected sequentially by the three projectors (P$_1$, P$_2$, P$_3$) are stored temporarily by time-division multiplexing. In three additional image storages (18a-c), correction values are stored which have been calibrated to describe phase distortions of the bar patterns projected by the three projectors, said distortions resulting from geometric imperfections in the optical setup of the apparatus. These correction values are subtracted from the bar phases ($\delta_1$, $\delta_2$, $\delta_3$) in ALU (16). The corrected phase values are returned to image storage (17a-c) and are then further processed in a second computing unit, ALU (19), which computes the differences ($\Delta_1 = \delta_1 - \delta_2$) and ($\Delta_2 = \delta_1 - \delta_3$). These values are required for calculation of the lens distance (z) satisfying equations (11), (12) and (13). [NOTE: For calculating equation (13) as well as equations (14) and (15), ($\Delta_3 = \Delta_2 - \Delta_2$).]

Figure 5B:
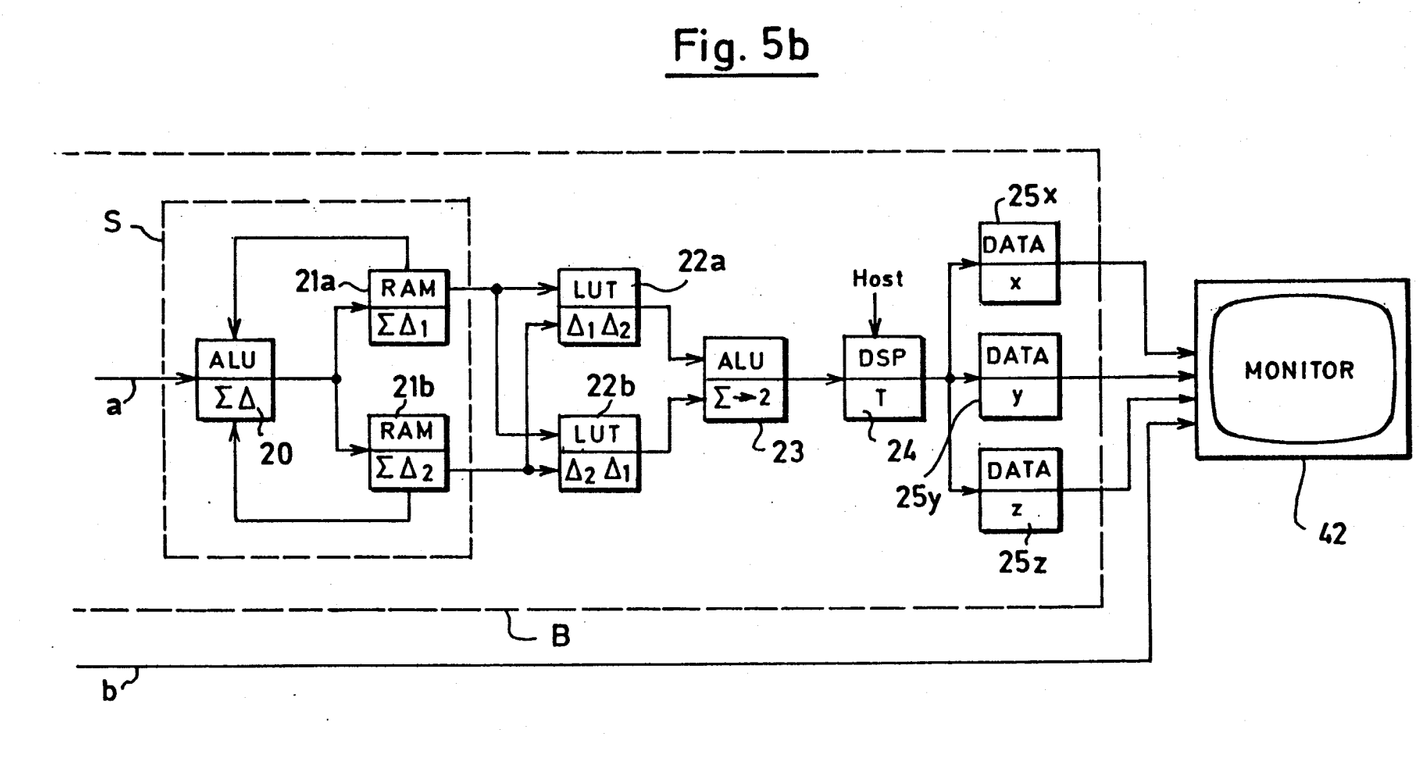

ALU (19) is followed by a summation stage (S) [See FIG. 5b] which comprises ALU (20) and two RAM storages (21a, 21b). The phase differences ($\Delta_1$, $\Delta_2$) for each image point are accumulated in RAMs (21a) and (21b). This may be accomplished, for example, by integral arithmetic process in such a manner that the 8-bit input values of the signals representing the phase differences ($\Delta_1$, $\Delta_2$) are summed up within a data range of 16 bits in storage units (22a) and (22b). In this way, it is possible to average the phase differences (for each pixel or other preselected image point) obtained from 255 images and thus improve the accuracy of phase measurement.

The averaged phase difference measurements for each point are fed from image storage units (21a) and (21b) to two successive additional computing units (22a) and (22b), where the formulas for calculating the object distance satisfying equations (14) and (15) are available in additional look-up tables. Computing units (22a) and (22b) compute two values for the object distance (z) which are averaged out in computing unit (23). In a subsequent digital signal processor, DSP (24), the coordinates (x) and (y) of each image point are calculated, satisfying equations (16) and (17) from the measured values for (z) and from the apparatus constants ($x_k$), ($y_k$) and ($a_k$) supplied by the host computer. These x, y, and z values are then displayed on TV monitor (42).

By employing the described method, height information concerning the object to be measured can be obtained absolutely and not only in terms of modulo $2\pi$ of the bar pattern.

The above-described method of evaluation requires that the signals produced by camera (K) be generated in the linear region of the camera's characteristic curve and that, in particular, there be no undershoot or overshoot. Further, the described method requires that, within each sequence of images of the three bar patterns, a phase value is continued to be processed only when the phase values in all three images of the sequence are valid for a specific image point. These validity computations are carried out in module (C) of FIG. 5a. The validity of a measured value is checked in the look-up table (LUT) associated with computing unit (15). The AND-link of the three video image sequences is generated in the computing unit $ALU^1$ (26), together with a recursively connected RAM component (27). During subsequent computing stage (28), the number of valid measured values in each image point is calculated and then stored in RAM (29). The number of such measured values represents the number of video images over which phase differences are summed up in stage (S) of FIG. 5b. If a suitable limit is selected which defines a minimum number of valid measurements for each image point, all image points are excluded where the number of valid measurements is below this limit and only remaining image points are included in the calculation of the result. The data mask defined in this manner is represented symbolically by block (30) in FIG. 5a. It can be used to darken appropriate image point locations of video monitor (42).

The just-described computer circuitry processes the camera signals in accordance with the method of the invention herein. By this means, the bar patterns are projected in sequence by the three projectors ($P_1$, $P_2$, $P_3$) by time-division multiplexing, and the images are recorded by camera (K) and processed in sequence. However, it is also possible to project the bar patterns simultaneously, for example, in different colors, and to record them simultaneously with three color-divided cameras. This multicolor system requires that the input channel, i.e., analog-to-digital converter (12), convolution components (14a, 14b), and the time-division multiplexing computing units (15, 16), must be repeated to comprise three parallel units. While this increases costs, it does offer a greater bandwidth in the processing frequency. Conversely, although the described computing operations could also be run on an appropriately programmed high-performance conventional computer, operating sequentially, such sequential operation so greatly increases running times that real time processing of the video signals would not be possible.

Figure 2:
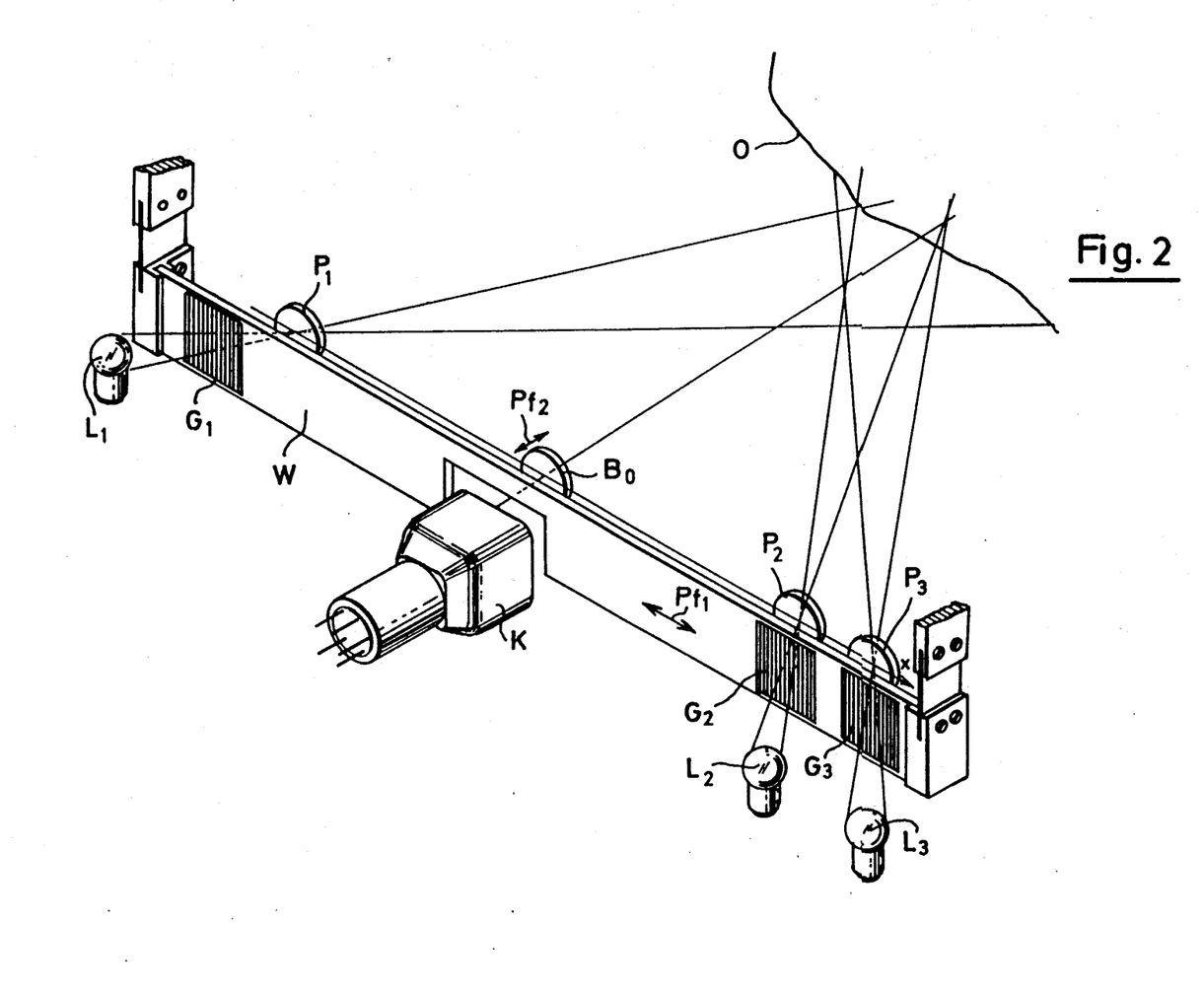
FIG. 2 is a perspective illustration of the essential components of the apparatus shown schematically in FIG. 1.

Since the gratings used for projecting the bar patterns are fixed relative to each other, and since the just-described method computes the z-measurement as a function of the difference of two projections, e.g., the bar patterns of projectors ($P_1$) and ($P_2$) or those of projectors ($P_2$) and ($P_3$), support (W) with its gratings ($G_1$) through ($G_3$) [see FIG. 2] can be shifted in the direction of the arrow ($Pf_1$) without affecting the z-values obtained during signal evaluation. In conjunction with this, several sets of measurements may be carried out using different positions of the grating support (W) so that different areas of the gratings are illuminated for each set of measurements. Since individual measurements of the phase differences ($\Delta\psi$) of all images are added up and averaged, statistical errors (resulting either from manufacturing imperfections of the gratings or during any individual application of the evaluation algorithm) can be improved by $\sqrt{N}$ where N represents the number of measurements. At the same time, the intensity of the projected illumination can be selected from zero to saturation so that useful measured values may possibly be obtained from all points of the object surface, including those which may exhibit widely different reflectances. In conjunction with this, the electronic mask (module C of the circuit in FIG. 5a) assures that all measurements in the non-linear range of camera (K) will be discarded.

Figure 3:
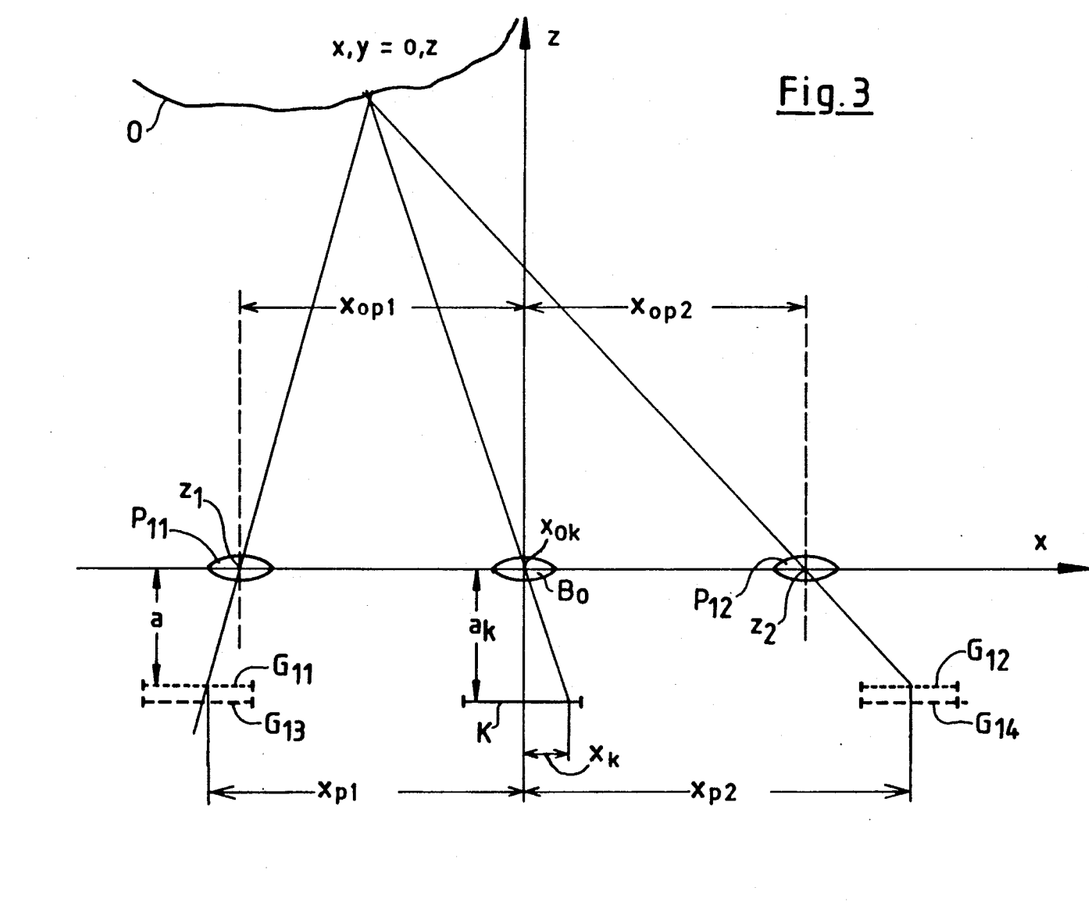
FIG. 3 is a schematic diagram showing the geometrical setup of the optics of a second preferred embodiment of the invention herein.
Figure 4:
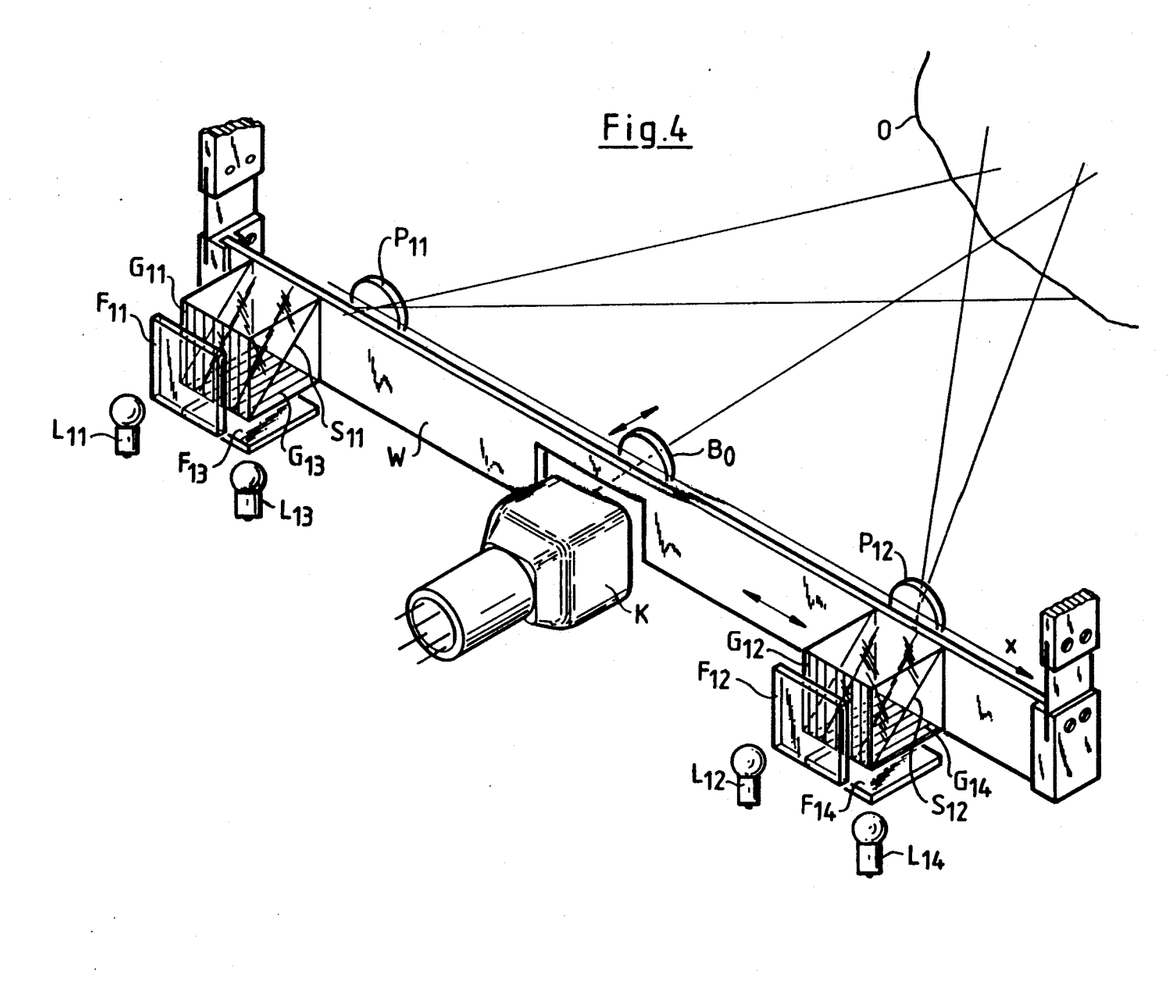
FIG. 4 is a perspective illustration of the essential components of the apparatus shown schematically in FIG. 3.

FIGS. 3 and 4 show a second embodiment of the invention herein. FIG. 3 is a schematic representation of the basic elements of this alternative measuring apparatus which essentially comprises two projection lens systems ($P_{11}$, $P_{12}$) and two pairs of gratings ($G_{11}/G_{13}$, $G_{12}/G_{14}$). The camera sensor (K) and its attached viewing lens ($B_0$) are positioned between the projectors ($P_{11}$, $P_{12}$). Each pair of gratings has the same grating constant (i.e., period), while one of the grating pairs has a period which varies slightly from the period of the other pair. That is, the period of one of said two grating pairs differs from the period of the other pair by an amount which is small when compared to the period of each pair. For example, in the illustrated system, the grating pair ($G_{11}/G_{13}$) has a period of 25 line pairs per mm., while the other pair ($G_{12}/G_{14}$) has a grating constant of 25.5 line pairs per mm.

Therefore, the beat frequency associated with the bar patterns projected by one pair of gratings ($G_{11}/G_{13}$) has a first effective wavelength ($\lambda_1$) and exhibits constant phase differences on a first set of plane surfaces perpendicular to camera axis (z), while the bar patterns projected by the other pair of gratings ($G_{12}/G_{14}$) create a beat frequency having a slightly different wavelength ($\lambda_2$) which exhibits constant phase differences on a second set of planes, parallel to the first set. By comparing the phase differences for one of these wavelengths ($\lambda_1$) with the phase differences of the other wavelength ($\lambda_2$) at each image point, a third beat frequency is generated with an effective wavelength:

$$\lambda_{eff} = \frac{\lambda_1 \cdot \lambda_2}{\lambda_1 - \lambda_2}$$

which is much greater than either of the respective wavelengths ($\lambda_1$, $\lambda_2$) associated with the two pairs of bar patterns. The much greater wavelength of this further beat frequency can be used to eliminate any ambiguities that might otherwise occur when only one of the bar pattern pairs is used for measurement, such ambiguities arising when the height variations of the object surface are so large that the same phase difference may be obtained on two widely different planes.

A further group of formulas can be used to evaluate the two sets of bar patterns generated in accordance with this second preferred embodiment which has just been described. These further formulas can be obtained easily from the equations derived above relating to the embodiment illustrated in FIGS. 1 and 2. Equation (8) can be rewritten for the two pairs of gratings ($G_{11}/G_{13}$, $G_{12}/G_{14}$) having respective different periodicities ($P^1$) and ($P^2$), as follows:

$$z = \frac{(x_{op1} - x_{op2}) \cdot a}{(n_1^1 - n_2^1 + \delta_1^1 - \delta_2^1) \cdot P^1} \quad (18)$$

$$z = \frac{(x_{op1} - x_{op2}) \cdot a}{(n_1^2 - n_2^2 + \delta_1^2 - \delta_2^2) \cdot P^2} \quad (19)$$

-continued or $$z = \frac{K}{(N^1 + \Delta^1)P^1} \quad (20)$$

$$z = \frac{K}{(N^2 + \Delta^2)P^2} \quad (21)$$

where:
K represents an apparatus constant,
$N^1 = n_1^1 - n_2^1$, $N^2 = n_1^2 - n_2^2$
and $\Delta^1 = \delta_1^1 - \delta_2^1$ and $\Delta^2 = \delta_1^2 - \delta_2^2$.
Hence it follows:

$$z = (N^2 - N^1 + \Delta^2 - \Delta^1)\frac{P^1 \cdot P^2}{P^1 - P^2} \quad (22)$$

Equation (22) describes a function in terms of a wavelength which is quite large when compared to the wavelengths used in equations (20 and (21); and the computer, in a manner similar to that described above, measures and evaluates the respective phase increments $$\delta_1^1, \delta_1^2, \delta_2^1, \delta_2^2$$

of the two sets of bar patterns projected by the four gratings ($G_{11}$–$G_{14}$) to satisfy equation (22) and thus determine the object distance z based upon the phase differences between the two different beat frequencies.

As noted above, the four bar patterns are not superimposed on the object at the same time but rather are projected separately so that the camera receives only one clearly defined bar pattern at a time for evaluation by the computer. Apparatus for accomplishing this is best seen in FIG. 4 in which the two gratings ($G_{11}$, $G_{13}$) associated with projection lens system ($P_{11}$) are attached to respective surfaces of a first beam-splitting cube ($S_{11}$), and the two gratings ($G_{12}$, $G_{14}$) associated with projection lens system ($P_{12}$) are similarly attached to a second beam-splitting cube ($S_{12}$). The two gratings ($G_{11}$) and ($G_{13}$) are illuminated by respective light sources ($L_{11}$, $L_{13}$) through respective color filters ($F_{11}$, $F_{13}$) to form bar patterns of different colors which can be processed separately by color camera (K). The bar patterns projected with gratings ($G_{12}$) and ($G_{14}$) are similarly distinguished by using respective color filters ($F_{12}$, $F_{14}$) illuminated by respective lamps ($L_{12}$, $L_{14}$).

Of course, other methods may be used to distinguish the individual bar patterns. For instance, the lamps ($L_{11}$–$L_{14}$) can be sequentially energized by means of time-division multiplexing circuitry, or the patterns can be appropriately separated by means of polarization optics.

We claim:

1. In apparatus for the non-contact measurement of object surfaces, said apparatus having:
   at least two projectors for projecting bar patterns onto the surface of the object to be measured;
   a video camera (K) having an axis aligned with the object to be measured for recording images of bar patterns reflected from a plurality of points on the surface of the object; and
   computer means for evaluating said recorded images to determine height information (z) for said plurality of points;
   the improvement wherein said projectors project at least two pairs of gratings ($G_{11}/G_{13}$, $G_{12}/G_{14}$), the respective gratings of each pair being projected by a respective one of said projectors, the gratings of each pair having the same period but the periods of the two pairs of gratings being slightly different so that the periods of said two gratings pairs differ from each other by an amount which is small when compared to the period of each grating.

2. The apparatus according to claim 1 further comprising color control elements ($F_{11}F_{12}$, $F_{13}F_{14}$) for causing said bar patterns to be projected in different colors, and wherein said camera (K) is a color camera.

3. In a method for the non-contact measurement of object surfaces by projecting bar patterns on the object surface, detecting reflections of said patterns with a camera, and evaluating the camera images of said reflections to calculate height measurements for a plurality of points on said object surface, the improvement comprising the steps of:
   projecting several bar patterns on the object surface, said patterns having the same period or slightly different periods;
   comparing the detected reflections of said bar patterns; and
   creating at least two beat frequencies from said reflected patterns so that each said beat frequency has a different effective wavelength.

4. The method according to claim 3 comprising the further steps of:
   separately recording the image of each bar pattern at each of said plurality of points;
   calculating the bar phase ($\delta_1$, $\delta_2$, $\delta_3$) of each reflected bar pattern for each said point; and
   computing the differences ($\Delta_1$, $\Delta_2$, $\Delta_3$) between the bar phases calculated for each bar pattern for each said point and using said computed bar phase differences to determine the height measurement (z) for each point in the direction of the camera axis.

5. The method according to claim 3 wherein:
   said bar patterns all have the same period; and
   each said bar pattern is projected through a respective projection center so that, for each said point on the object surface, the respective projections through said respective projection centers and said point are inclined at different angles with respect to each other.

6. The method according to claim 5 wherein said bar patterns are created by illuminating three gratings ($G_1$, $G_2$, $G_3$) positioned on a common plane.

7. The method according to claim 3 wherein said bar patterns are created by illuminating two pairs of gratings ($G_{11}/G_{12}$, $G_{13}/G_{14}$), each pair of gratings having the same period, but the periods of the two pairs of gratings being slightly different so that the periods of said two grating pairs different from each other by an amount which is small when compared to the period of each pair.

8. The method according to claim 7 wherein at least two of said bar patterns ($G_{11}$, $G_{12}$, $G_{13}$, $G_{14}$) are projected separately using illumination of different colors or different polarization.

9. Apparatus for the non-contact measurement of object surfaces, comprising:
   at least two projectors for projecting respective bar patterns onto the surface of the object to be measured, each projector having a respective projection center;
   camera means for recording images of bar patterns reflected from a plurality of points on the surface of the object, said camera means having a lens with a lens center and an axis aligned with the object to be measured;

said projectors being arranged so that projections through said respective projection centers and each said point on the object surface are inclined, respectively, at different angles to axes through each said point and said lens center; and means for evaluating the phase differences between said projected patterns at each of said plurality of points.

10. The apparatus of claim 9 further comprising at least one additional projector ($P_1$), each projector having a respective grating ($G_1$, $G_2$, $G_3$) for projecting a respective one of said bar patterns, and wherein at least two of said gratings having the same periodicity and all of said gratings are positioned on a common support (W).

11. The apparatus of claim 10 wherein all of said gratings ($G_1$, $G_2$, $G_3$) are positioned in the same plane and wherein said common support is movable relative to the optical axis of the camera in the plane of said gratings.

* * * * *

UNITED STATES PATENT AND TRADEMARK OFFICE
CERTIFICATE OF CORRECTION

PATENT NO. : 5,135,309

DATED : August 4, 1992

INVENTOR(S) : Michael Kuchel and Albrecht Hof

It is certified that error appears in the above-identified patent and that said Letters Patent is hereby corrected as shown below:

Column 6, line 48, delete "plants" and insert --planes--.

Column 12, line 4, delete "gratings" and insert --grating--; line 54, delete "different" and insert --differ--.

Signed and Sealed this

Thirtieth Day of November, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,135,309

DATED : August 4, 1992

INVENTOR(S) : Michael Kuchel and Albrecht Hof

It is certified that error appears in the above-identified patent and that said Letters Patent is hereby corrected as shown below:

Column 6, line 48, delete "plants" and insert --planes--.
Column 8, line 34, delete "lens" and insert --object--.
Column 12, line 4, delete "gratings" and insert --grating--; line 54, delete "different" and insert --differ--.

This certificate supersedes the Certificate of Correction issued on November 30, 1993.

Signed and Sealed this

Twenty-second Day of February, 1994

Attest:

BRUCE LEHMAN

Attesting Officer

Commissioner of Patents and Trademarks